and Louis G. Nickell,
United States Patent Office 2,747,334
Patented May 29, 1956

2,747,334

CULTIVATION OF PLANT TISSUE

John B. Routien, Tenafly, N. J., and Louis G. Nickell, Brooklyn, N. Y., assignors to Chas. Pfizer & Co., Inc., New York, N. Y., a corporation of Delaware No Drawing. Application May 20, 1952,
Serial No. 288,954

7 Claims. (Cl. 47—58)

This invention is concerned with a method for cultivating plant tissue under submerged, aerated conditions in liquid culture. It is also concerned with the production of useful materials by this method.

It has been known for some years that plant tissues or parts of plants may be cultivated in vitro. Furthermore, in the presence of certain agents, plant tissue may be induced to proliferate in an unusual fashion; that is, continuous growth of the same type of cells or of related types of cells, without specialization of these cells for organized functions such as the formation of roots, leaves, etc., or indeed of the whole plant, can be achieved. This type of uninterrupted regeneration is called undifferentiated cell growth. Such cultures may be transferred and continue to grow for extended periods of time, in many cases indefinitely. In fact, in some cases, it is possible to continue such growth after a period without the presence of the agent which originally induced the plant tissue or organ to begin its undifferentiated growth. This is due to the production of the desired growth promoter by the tissue itself.

The type of growth to which we refer has been reviewed by White in "Survey of Biological Progress," edited by G. S. Avery, Jr., volume I, pages 267–280 (publ. 1949). Examples of this type of development of plant tissue are galls, tumors, and chemically-induced overgrowths in plants; for instance, crown-gall tumors, genetic tumors of Nicotiana, virus tumors, growth of normal plant tissue in the presence of plant stimulants, auxins or hormones and so forth. Numerous agents naturally or artificially applied can cause the unusual type of growth with which we are concerned. Whether these agents selectively stimulate the growth of plant cells in undifferentiated form, that is, as embryonic-type cell growth, or whether the agents maintain such growth by suppressing or preventing differentiation is not clear. Whatever the mechanism, the effect is the same. In the undifferentiated or embryonic-type cell growth all or most of the cells present are the same or closely related in structure and function.

The agents used to bring about undifferentiated or embryonic-type cell growth include virus infections, such as *Aureogenus magnivena,* which causes tumors in many plants, bacterial infections such as *Agrobacterium tumefaciens,* which causes crown-gall in many plants, growth hormones (such as indoleacetic acid, indolebutyric acid, naphthaleneacetic acid, and p-chlorophenoxyacetic acid) and excretions from certain insects. In some cases, these agents, i. e., embryonic-type cell growth stimulants, may be used in combination.

The great value of this invention in enabling the production of cells predominantly of one type on a large scale under controlled conditions is evident. Generally, when plants are grown under normal field conditions, a considerable volume of the plant tissue produced is not readily edible. However, if the plant tissue is grown by the process of this invention, the entire mass may be obtained in edible form. It should be noted that growth of a given plant tissue under the conditions of this invention does make possible the large scale, convenient production of plant products by submerged culture. With a minimum of testing, many valuable materials are obtainable.

In the case of non-pathological tissues, after growth in a series of transfers, some of the tissues become capable of growth in the same manner without the presence of the agent used to initiate the undifferentiated growth. This habituation of the culture allows the continued growth of the cells in an appropriate nutrient solution without further addition of the agent used to induce such growth. This is presumably due to the production of the essential stimulant by the tissue itself. The nutrient solutions used for the static solid or liquid media for such growths are well known. They generally include mineral salts, carbohydrate, a nitrogen source and, in most cases, certain vitamins. If a solid medium is used, agar is added to this mixture.

It has now been found that plant tissues of the nature of those described, that is, plant tissues in the presence of a growth promoter, either added or self-produced, may be cultivated under conditions of submerged growth. The mixture may be agitated and aerated at a suitable temperature to bring about the rapid and widespread growth of small groups of cells. In this way it is possible to produce large quantities of the tissue which, in many cases, have nutrient value of themselves and which may be used for the production of various valuable materials. Thus, by this invention, one is enabled to prepare large masses of vegetable material in a manner previously unknown. The growth under submerged, agitated, aerated conditions may be conducted on a large scale. During growth the product is present as discrete cell masses of relatively small size and this makes much easier the absorption of oxygen and nutrient materials from the solution and the excretion of waste products. The cell masses seem to be uniformly active throughout and the tendency to form woody tissue that occurs in static cultures is not generally observed.

By plant tissues in this application is meant the tissues of those plants classified above the Thallophytes in systematic botany, which tissues have been induced to undergo continuous growth in one or more of the manners described above. In operating the submerged growth process of this invention, an aqueous medium is used which contains one or more carbohydrates. The requirement of the various types of plant tissue vary somewhat. However, materials such as glucose, sucrose, corn syrup, starch, dextrose, and other materials of this nature may be used as the carbohydrate. In addition, the nutrient medium contains mineral salts, including phosphates, nitrates, chlorides, sulfates, and metals including sodium, potassium, calcium, magnesium and those elements needed in trace amounts. The trace metals are normally present as impurities in all but the most highly purified inorganic compounds. They may be added if purified chemicals are used in the media. The optimum mineral requirement of the particular culture used may be determined by routine experimentation. Mixtures of metallic salts, such as are used in media for mold fermentations, are often quite suitable. Care must be exercised to avoid combinations of salts which form precipitates. A third component of the medium, in addition to carbohydrate and mineral salts, is vitamins. In general, at least one or more of the common vitamins are required for optimum growth of the plant tissue by the process of this invention. These include thiamine, riboflavin, pantothenic acid, niacin, and so forth. A mixture of these will assure satisfactory growth. A crude vitamin source, such as yeast extract, is particularly useful. As in the case of the mineral salts, the vitamin requirement of the particular tissue being used may be determined with relative ease. In general, a carbohydrate solution, fortified with minerals and vitamins, is used for cultivation of the plant tissues. When a growth stimulant is used to promote the proper growth of a normal plant tissue it should be used in very dilute concentration in either solid or liquid media. A level of about $1 \times 10^{-6}$ molar is suitable but somewhat higher or lower concentrations may be used. Experimentation will readily establish the optimum concentration.

We prefer to control the temperature of the growth process in the range between about 20° and 30° C., although somewhat higher or lower temperatures may be used with particular cultures. Aeration should be at a high rate to induce rapid growth of the materials; preferably at least about a quarter of a volume of air per volume of culture medium per minute. Agitation may be furnished by various types of stirrers such as those that are now used in mold fermentations. The rate of aeration and agitation and the type of apparatus which is most useful for any given type of plant tissue will vary. However, by routine experimentation, it is possible to find the optimum conditions for any particular growth. In general, the growth of the plant tissue under submerged, aerobic conditions requires at least about 5 days and, in some cases, may require a week or more to obtain the maximum growth. In carrying out the growth process on a large scale, transfers may be made from static cultures of the desired plant tissue to small scale submerged fermentation units before the tissue growth is used for seeding the large scale fermentors. Alternatively, shaken flasks may be used as an intermediate stage in the large scale cultivation of these materials. If the agitation used is not sufficient to break the tissue into fine enough clumps of cells, the enzyme, pectinol, may be added at the start or during the growth to cause the larger clumps to break down.

A variety of valuable products may be produced by the method of this invention. Not only is the plant tissue itself of potential value as food or fodder but, in addition, a variety of valuable compounds are produced, either in the liquid culture medium or retained in the cells of the tissue. By choosing suitable plant tissue, various valuable materials may be formed. These include vitamins, steroids, alkaloids of various types, antimicrobial agents, sugars, enzymes, organic acids, aromatic materials, and so forth. The recovery of the materials from the plant tissue growths may be accomplished by standard methods. For instance, certain of the vitamins may be adsorbed from aqueous solution on materials such as fuller's earth or activated carbon. The alkaloids may be extracted under basic conditions into certain solvents such as halogenated hydrocarbons. Organic acids which are soluble in water may be recovered by filtration of the solid tissue growth and precipitation of the organic acid by means of a suitable metallic ion such as calcium or by concentration to recover the crystalline acid. If the desired product is contained in the solid tissue material, it may be necessary to treat the solids by means of agents which will release the compound. For instance, if steroids are present, it may be desirable to use an extraction with a hot organic solvent, such as one of the aliphatic alcohols to release the material or with alkali, followed by a solvent extraction.

The general procedure to be followed in carrying out this invention is as follows. A plant tissue is selected. Sterile samples of the material are prepared (e. g. by treatment with mercuric chloride, chlorine or other sterilizing agent) and are then planted on a solid medium under sterile conditions. The plant tissue is then subjected to the action of appropriate agents incorporated in the medium, such as plant growth hormones, to induce the desired proliferation of the tissue if non-pathological tissue is used. If pathological tissue is used, there is usually no need for the addition of the stimulating material since this type of tissue usually produces an agent of this nature itself. The culture is generally transferred several times to assure that a strong, rapidly growing material is obtained. A suitable liquid medium for the growth of the material is prepared (this may have the same composition as the solid medium minus the agar) and the medium is inoculated or seeded with a culture from the static medium. The medium is then subjected to aeration and agitation under sterile conditions. After a suitable period of growth, the product is either harvested or utilized for seeding a larger quantity of a suitable medium. After growth has been completed in the larger vessel, the desired product or products may be recovered from either the tissue, the aqueous medium, or from both. It is important that before the large scale submerged fermentation is run, strong, vigorously growing plant tissue be obtained either by a number of transfers on static culture or by several transfers in smaller scale submerged-growth vessels. This invention is only concerned with the growth of the vegetable tissue under submerged, aerated conditions.

The following examples are given by way of illustration only and are not to be considered as the sole embodiments of this invention. It is to be understood that protection hereof is only limited by the specific wording of the appended claims.

EXAMPLE I

A sample of virus tumor (caused by the virus *Aureogenus magnivena*, Black) was removed from a sorrel plant (*Rumex acetosa* L.). The surface of the tumor was sterilized by means of a dilute, aqueous solution of mercuric chloride. The tissue was then placed in a sterile petri dish and normal non-tumorous tissue was cut away and discarded. The tumor tissue was then placed on a sterile nutrient agar medium prepared in the usual manner from the following materials:

20 milliliters, 0.1 M, potassium nitrate
30 milliliters, 0.1 M, calcium nitrate
80 milliliters, 0.1 M, potassium dihydrogen phosphate
10 milliliters, 0.1 M, magnesium sulfate
30 milliliters, 0.1 M, calcium chloride
20 milliliters, 0.1 M, potassium chloride
10 milliliters, 0.1 M, magnesium chloride
10 milliliters vitamin solution (see below)
1 milliliter trace element solution (see below)
20 grams sucrose
789 milliliters distilled water
10 grams agar

*Vitamin solution*

1 milligram thiamine hydrochloride
8 milligram pyridoxine hydrochloride
8 milligram niacin amide
100 milliliters water

*Trace elements solution*

570 milligrams boric acid
360 milligrams manganese chloride monohydrate
625 milligrams zinc chloride
268 milligrams cupric chloride dihydrate
252 milligrams sodium molybdate dihydrate
1825 milligrams ferric tartrate
1000 milliliters water The tumor tissue was allowed to grow on the sterile medium at room temperature for a period of several weeks. The material increased in volume during this time and was growing well. A section of it was transferred under sterile conditions to another portion of the sterile agar medium described above. A total of eight transfers at two or three week intervals with division of the culture when necessary was carried out. The vigorously growing tumor tissue was then used to seed a flask containing the same medium as described above with the exception of the agar. A fragment of the tumor weighing ¼ to ½ gram was used to see 100 milliliters of the liquid medium in a 500-milliliter vessel. As before, all operations were conducted under sterile conditions. The mixture was agitated and aerated and, after two weeks, the product was filtered. In a series of such experiments, it was found that the tissue, on a dry weight basis, had increased in weight about ten to twenty times during this submerged, aerated growth. The finely divided tissue was filtered from the liquid medium, dried at 100° C. overnight and ground in a Wiley mill. The product was assayed for oxalic acid and found to contain 10% of this product. This was the average weight of material in three runs and is based on the dry weight of the tissue. The oxalic acid may be recovered by acidification and extraction with hot water. Further known operations may be used to purify this material.

EXAMPLE II

Sweet clover seeds were planted on the agar medium described above but containing $5 \times 10^{-6}$ molar p-chlorophenoxyacetic acid, yeast extract and only 10 milliliters of potassium dihydrogen phosphate solution rather than 80 milliliters. The roots that formed on germination developed abnormal overgrowths. A section of the root tissue overgrowth was planted on the same agar medium containing the p-chlorophenoxyacetic acid and yeast extract. The tissue was cultivated in the presence of this plant growth stimulant through ten subcultures on the solid medium. The vigorously growing tissue was then transferred to sterile liquid medium of the composition indicated in Example I but containing $5 \times 10^{-6}$ molar p-chlorophenoxyacetic acid and yeast extract. The liquid medium was agitated and aerated for a period of about three weeks at room temperature. The product was then removed by filtration. The tissue was dried at 100° C. overnight and it was then assayed by a standard procedure for coumarin and melilotic acid, the dry product containing 520 micrograms of coumarin per gram and 776 micrograms of melilotic acid per gram.

EXAMPLE III

The procedure of Example II was repeated with leaf tissue of *Agave toumeyana* with essentially the same rapid, finely divided growth. The tissue that was obtained by growth under submerged, aerated conditions was isolated by filtration and it was then dried. This tissue may be useful as a source of steroid compounds.

EXAMPLE IV

Crown galls of the following plants were cultured in agar medium having the same composition as that given in Example I except that 10 milliliters of potassium dihydrogen phosphate solution was used.

Sweet clover
Sunflower stem
Sunflower petiole
Periwinkle
Tobacco
Cactus (Opuntia)
Datura After a number of transfers on agar medium and when vigorously growing tissue was obtained, each of the materials was transferred to a liquid medium having the same composition. The cultures were subjected to conditions of submerged, aerated cultivation at about 250° C. and under sterile conditions. The finely divided plant tissue that was formed in each case was harvested near the end of the initial rapid growth phase.

EXAMPLE V

Tissue from the cotyledon of an avocado was cultivated on an agar medium exactly as used in Example II. After several transfers the vigorously growing tissue was placed in a liquid medium having the same composition as that of Example II. Submerged, aerated growth resulted in the production of a finely divided mass of plant tissue. The avocado is known to produce an agent active against certain mycobacteria.

EXAMPLE VI

A crown gall growing on a tobacco plant (Nicotiana) was removed and sterilized with a mercuric chloride solution. A section of the crown gall was planted on agar having the same composition as that used in Example I except that only ten milliliters of potassium dihydrogen phosphate solution was used. The crown gall was grown on agar medium with a number of transfers. After vigorously growing tissue was obtained, a fragment of the crown gall was transferred to a liquid medium having the same composition except for the agar. The material was then grown under submerged aerobic conditions. After one month of growth, the product was removed from the medium. It was dried from the frozen state under vacuum and then ground to pass through a 60 mesh screen. The product was assayed for vitamin C content, and it was found that the material contained in excess of 150 micrograms of ascorbic acid per gram of the dried tissue.

What is claimed is:

1. A process for the production of finely divided masses of plant cells, which comprises inoculating a nutrient aqueous medium with vigorously growing, undifferentiated plant cells from plants classified above the Thallophytes in systematic botany, and maintaining said plant cells under conditions of submerged, agitated aeration in the presence of an embryonic-type cell growth stimulant.

2. A process as claimed in claim 1 wherein the vigorously growing, undifferentiated plant cells with which the aqueous medium is inoculated is a pathological plant tissue.

3. A process as claimed in claim 1 wherein normal undifferentiated plant cells are cultivated in the presence of an added growth promoter at a concentration of about $1 \times 10^{-6}$ molar.

4. A process as claimed in claim 1 wherein the agitated, aerated medium is maintained at a temperature of from about 20° C. to about 30° C.

5. A process as claimed in claim 1 wherein the nutrient medium contains a carbohydrate, vitamins, trace metallic elements, together with potassium, magnesium, calcium, nitrate, phosphate and sulfate ions.

6. A process for the production of oxalic acid, which comprises subculturing on solid medium *Rumex acetosa* tumor tissue until rapidly growing undifferentiated cells are obtained, transferring said cells to an aqueous nutrient medium, subjecting said medium to agitated aeration under sterile conditions at a temperature of about 250° C. for a period of at least about a week, removing the resulting tissue from the medium, and recovering oxalic acid therefrom.

7. A process for the production of coumarin, which comprises subculturing normal sweet clover tissue on a solid medium containing an added plant growth stimulant until vigorously growing, undifferentiated cell growth is obtained, transferring said undifferentiated cell growth to an aqueous nutrient medium containing an added plant growth stimulant, subjecting said medium to agitation and aeration under sterile conditions for at least about a week, and recovering the so-produced coumarin from the plant tissue.

References Cited in the file of this patent

UNITED STATES PATENTS

| | | |
|---|---|---|
| 2,198,150 | Barnhart | Apr. 23, 1940 |
| 2,258,291 | Jones | Oct. 7, 1941 |
| 2,423,873 | Coghill | July 15, 1947 |
| 2,479,295 | Behrens | Aug. 16, 1949 |
| 2,522,409 | Stoller | Sept. 12, 1950 |
| 2,550,701 | Lardy | May 1, 1951 |

(Other references on following page)

OTHER REFERENCES

Chemical Abstracts, vol. 27, p. 326 (1933), "Influence of Some Environmental - - - ."

White: "Plant Tissue Cultures." Ann. Rev. Biochem., vol. 11, pp. 615–628 (1942).

Henderson: "The Influence of Some Respiratory Inhibitors - - - ." Am. J. Botany, vol. 31, pp. 528–535 (October 1944).

Ellis et al.: "Soilless Growth of Plants," 2nd ed. (1947), pp. 46–49.

Humfeld: "The Production of Mushroom - - - ." Science, vol. 107, p. 373 (April 9, 1948).

Chemical Abstracts, vol. 43, col. 7093–g (1949).

White: "Growth Hormones and Tissue Growth in Plants." Survey of Biological Progress, vol. 1, pp. 267–280 (1949).

Chemical Abstracts, vol. 44, col. 6493 (1950).

Chemical Abstracts, vol. 46, col. 1104–d (February 10, 1952).